United States Patent [19]

Sato

[11] Patent Number: 5,599,713
[45] Date of Patent: Feb. 4, 1997

[54] APPARATUS FOR PURIFYING CONTAMINATED AIR

[75] Inventor: Shinichiro Sato, Yokohama, Japan

[73] Assignee: Fujita Corporation, Tokyo, Japan

[21] Appl. No.: 399,356

[22] Filed: Mar. 3, 1995

[30] Foreign Application Priority Data

Mar. 8, 1994 [JP] Japan .................................. 6-065730

[51] Int. Cl.⁶ ........................... A61L 9/00; B01D 53/00
[52] U.S. Cl. ........................ 435/300.1; 55/486; 55/512; 96/131; 422/124; 435/266
[58] Field of Search ................... 435/266, 300.1; 55/312, 385.1, 486, 512; 423/235; 96/131; 422/120, 124

[56] References Cited

U.S. PATENT DOCUMENTS

| | | | |
|---|---|---|---|
| H1,337 | 7/1994 | Hoeppel | 435/313 |
| 4,451,435 | 5/1984 | Holter | 422/271 |
| 4,786,297 | 11/1988 | Gethke et al. | 55/259 |
| 4,961,763 | 10/1990 | Thompson et al. | 55/312 |
| 5,217,696 | 6/1993 | Wolverton et al. | 422/121 |
| 5,277,877 | 1/1994 | Jeffrey et al. | 422/124 |
| 5,413,936 | 5/1995 | Rupert | 435/299 |

FOREIGN PATENT DOCUMENTS

| | | | |
|---|---|---|---|
| 0329643 | 2/1989 | European Pat. Off. | B01D 53/34 |
| 5-98829 | 10/1991 | Japan | E04H 6/08 |
| 5-103947 | 10/1991 | Japan | B01D 53/34 |
| 5-137947 | 11/1991 | Japan | B01D 53/34 |
| 5-329323 | 5/1992 | Japan | B01D 53/34 |
| WO9302716 | 2/1993 | WIPO | A61L 9/12 |

OTHER PUBLICATIONS

Rehm et al, *Biotechnology*, VCH Verlagsgesellschaft, Weinheim, Germany (1986), pp. 427–450.
WPI Acc No: 95–048024/07, Abstract.
JP 06327929, A, Abstract.

*Primary Examiner*—George Yeung
*Attorney, Agent, or Firm*—Ronald R. Snider

[57] ABSTRACT

Contaminated air, e.g., air contaminated by exhaust gases from automobiles and factories, is purified by passing the contaminated air through a soil layer populated with microorganisms. The contaminated air is humidified before the contaminated air is passed through the soil layer or while the contaminated air is being passed through the soil layer. The soil layer may be warmed, or ozone may be supplied to the contaminated air to oxidize nitrogen monoxide in the contaminated air into nitrogen dioxide before the contaminated air is passed through the soil layer.

3 Claims, 16 Drawing Sheets

FIG. 4

| MODE "A" | START | 5TH DAY | 10TH DAY | 15TH DAY | 20TH DAY |
|---|---|---|---|---|---|
| SOIL MOISTURE (pF) | 1.23 | 1.50 | 1.89 | 2.11 | 2.45 |
| CO FINAL GAS CONCENTRATION (ppm) | 23.5 | 11.3 | 12.3 | 22.4 | 24.9 |
| $NO_2$ FINAL GAS CONCENTRATION (ppm) | 0.56 | 0.45 | 0.52 | 0.64 | 0.67 |
| STATIC PRESSURE IN PERMEABLE LAYER (mmAq) | 200 | 82 | 54 | 32 | 22 |

FIG. 5

| MODE "B" | START | 5TH DAY | 10TH DAY | 15TH DAY | 20TH DAY |
|---|---|---|---|---|---|
| SOIL MOISTURE (pF) | 1.25 | 1.42 | 1.48 | 1.56 | 1.57 |
| CO FINAL GAS CONCENTRATION (ppm) | 22.8 | 10.7 | 5.2 | 4.9 | 4.7 |
| $NO_2$ FINAL GAS CONCENTRATION (ppm) | 0.55 | 0.37 | 0.20 | 0.19 | 0.18 |
| STATIC PRESSURE IN PERMEABLE LAYER (mmAq) | 200 | 95 | 74 | 56 | 55 |

FIG. 13

| MODE "A" | START | 5TH DAY | 10TH DAY | 15TH DAY | 20TH DAY |
|---|---|---|---|---|---|
| SOIL MOISTURE (pF) | 1.20 | 1.52 | 1.93 | 2.21 | 2.48 |
| SOIL TEMPERATURE (°C) | 18.2 | 12.8 | 12.5 | 13.6 | 14.3 |
| CO FINAL GAS CONCENTRATION (ppm) | 25.1 | 12.3 | 10.6 | 22.3 | 25.0 |
| $NO_2$ FINAL GAS CONCENTRATION (ppm) | 0.54 | 0.48 | 0.51 | 0.64 | 0.68 |
| STATIC PRESSURE IN CHAMBER (mmAq) | 200 | 86 | 43 | 25 | 18 |

FIG. 14

| MODE "B" | START | 5TH DAY | 10TH DAY | 15TH DAY | 20TH DAY |
|---|---|---|---|---|---|
| SOIL MOISTURE (pF) | 1.25 | 1.38 | 1.52 | 1.62 | 1.78 |
| SOIL TEMPERATURE (°C) | 18.5 | 15.5 | 14.9 | 14.5 | 14.3 |
| CO FINAL GAS CONCENTRATION (ppm) | 24.6 | 9.5 | 6.5 | 6.2 | 6.8 |
| $NO_2$ FINAL GAS CONCENTRATION (ppm) | 0.53 | 0.39 | 0.35 | 0.29 | 0.27 |
| STATIC PRESSURE IN CHAMBER (mmAq) | 200 | 95 | 63 | 57 | 41 |

FIG. 15

| MODE "C" | START | 5TH DAY | 10TH DAY | 15TH DAY | 20TH DAY |
|---|---|---|---|---|---|
| SOIL MOISTURE (pF) | 1.23 | 1.38 | 1.51 | 1.53 | 1.52 |
| SOIL TEMPERATURE (°C) | 18.9 | 25.3 | 25.6 | 25.4 | 25.6 |
| CO FINAL GAS CONCENTRATION (ppm) | 21.1 | 6.2 | 5.1 | 4.5 | 3.4 |
| $NO_2$ FINAL GAS CONCENTRATION (ppm) | 0.50 | 0.24 | 0.22 | 0.15 | 0.12 |
| STATIC PRESSURE IN CHAMBER (mmAq) | 200 | 90 | 62 | 54 | 53 |

FIG.18

|  | NO | NO$_2$ |
|---|---|---|
| PRESET NO CONCENTRATION | 1 ppm | — |
| NO$_x$ CONCENTRATION IN AIR INLET CHAMBER | 0.35 ppm | 0.66 ppm |
| NO$_x$ CONCENTRATION IN AIR OUTLET CHAMBER | 0.08 ppm | 0.02 ppm |

FIG.19

|  | NO | NO$_2$ |
|---|---|---|
| PRESET NO CONCENTRATION | 1 ppm | — |
| NO$_x$ CONCENTRATION IN AIR INLET CHAMBER | 1.01 ppm | 0.02 ppm |
| NO$_x$ CONCENTRATION IN AIR OUTLET CHAMBER | 0.85 ppm | 0.00 ppm |

1

APPARATUS FOR PURIFYING CONTAMINATED AIR

BACKGROUND OF THE INVENTION

1. Field of the Invention:

The present invention relates to a method of and an apparatus for purifying contaminated air in the environmental atmosphere.

2. Description of the Related Art:

There has been known a conventional method of purifying contaminated air in the environmental atmosphere by passing the contaminated air through a soil layer populated with microorganisms to allow the contaminants in the contaminated air to be degraded by the microorganisms in the soil layer. Such a purifying method and an apparatus for carrying out the method have proven much more satisfactory than traditional methods of and apparatus for purifying contaminated air. However, the existing method and apparatus still remain to be improved for better air purification.

SUMMARY OF THE INVENTION

It is an object of the present invention to provide a method of and an apparatus for purifying contaminated air in the environmental atmosphere by passing the contaminated air through a soil layer populated with microorganisms to allow the contaminants in the contaminated air to be degraded by the microorganisms in the soil layer.

According to the present invention, there is provided a method of purifying contaminated air by passing the contaminated air through a soil layer populated with microorganisms, comprising the step of humidifying the contaminated air which is passed through the soil layer. The contaminated air may be humidified before passing through the soil layer or may be humidified in the soil layer while the contaminated air is passing through the soil layer. The soil layer may be warmed, or ozone may be supplied to the contaminated air to oxidize nitrogen monoxide in the contaminated air into nitrogen dioxide before the contaminated air is passed through the soil layer.

According to the present invention, there is also provided an apparatus for purifying contaminated air, comprising a container, a soil layer disposed in the container for being populated with microorganisms, the soil layer allowing contaminated air to pass therethrough, a humidifier for humidifying contaminated air, and air supply means for supplying the contaminated air humidified by the humidifier from the humidifier to the soil layer. The apparatus may further comprise a permeable layer disposed in the container, the permeable layer allowing contaminated air and water to pass therethrough, the arrangement being such that the contaminated air humidified by the humidifier is supplied through the permeable layer to the soil layer.

According to the present invention, there is also provided an apparatus for purifying contaminated air, comprising a container, a soil layer disposed in the container for being populated with microorganisms, the soil layer allowing contaminated air to pass therethrough, a permeable layer disposed in the container, the permeable layer allowing contaminated air and water to pass therethrough, air supply means for supplying contaminated air through the permeable layer to the soil layer, and water supply means for supplying water to the permeable layer. The apparatus may further comprise warming means for warming the soil layer. The permeable layer may be disposed beneath the soil layer, and the warming means may comprise a receptacle disposed below the permeable layer for storing water, a heater for heating the water stored in the receptacle to produce a warm water vapor, and an introducing section for introducing the warm water vapor into the soil layer.

According to the present invention, there is further provided an apparatus for purifying contaminated air, comprising a container, a soil layer disposed in the container for being populated with microorganisms, the soil layer allowing contaminated air to pass therethrough, a space defined in the container for introducing contaminated air therein, air supply means for supplying contaminated air to the space and passing the contaminated air through the soil layer to purify the contaminated air, an outlet port mounted on the container for discharging purified air from the soil layer, an ozonizer for generating ozone, and a communication passage interconnecting the ozonizer and the space. The apparatus may further comprise a pipe connected to the space for introducing the contaminated air into the space, the communication passage being connected to the pipe, and a mesh disposed in a lower portion of the container above a lower end panel of the container, the mesh supporting the soil layer and allowing contaminated air to pass therethrough, the space being defined in the container between the mesh and the lower end panel of the container, the outlet port being disposed on an upper end panel of the container, the air supply means comprising an air pump connected to the pipe for delivering the contaminated air through the pipe into the space.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a table of the results of an experiment carried out in a mode "A" by the experimentation system shown in FIG. 3 for removal of carbon monoxide and nitrogen dioxide;

FIG. 5 is a table of the results of an experiment carried out in a mode "B" by the experimentation system shown in FIG. 3 for removal of carbon monoxide and nitrogen dioxide;

FIG. 13 is a table of the results of an experiment carried out in a mode "A" by the experimentation system shown in FIG. 9 for removal of carbon monoxide and nitrogen dioxide;

FIG. 14 is a table of the results of an experiment carried out in a mode "B" by the experimentation system shown in FIG. 9 for removal of carbon monoxide and nitrogen dioxide;

FIG. 15 is a table of the results of an experiment carried out in a mode "C" by the experimentation system shown in FIG. 9 for removal of carbon monoxide and nitrogen dioxide;

FIG. 18 is a table of the concentrations of nitrogen oxide and nitrogen dioxide measured when an ozone gas was supplied to the experimentation system shown in FIG. 17; and FIG. 19 is a table of the concentrations of nitrogen oxide and nitrogen dioxide measured when no ozone gas was supplied to the experimentation system shown in FIG. 17.

DETAILED DESCRIPTION OF THE PREFERRED EMBODIMENTS

[1st Embodiment]

Figure 1:
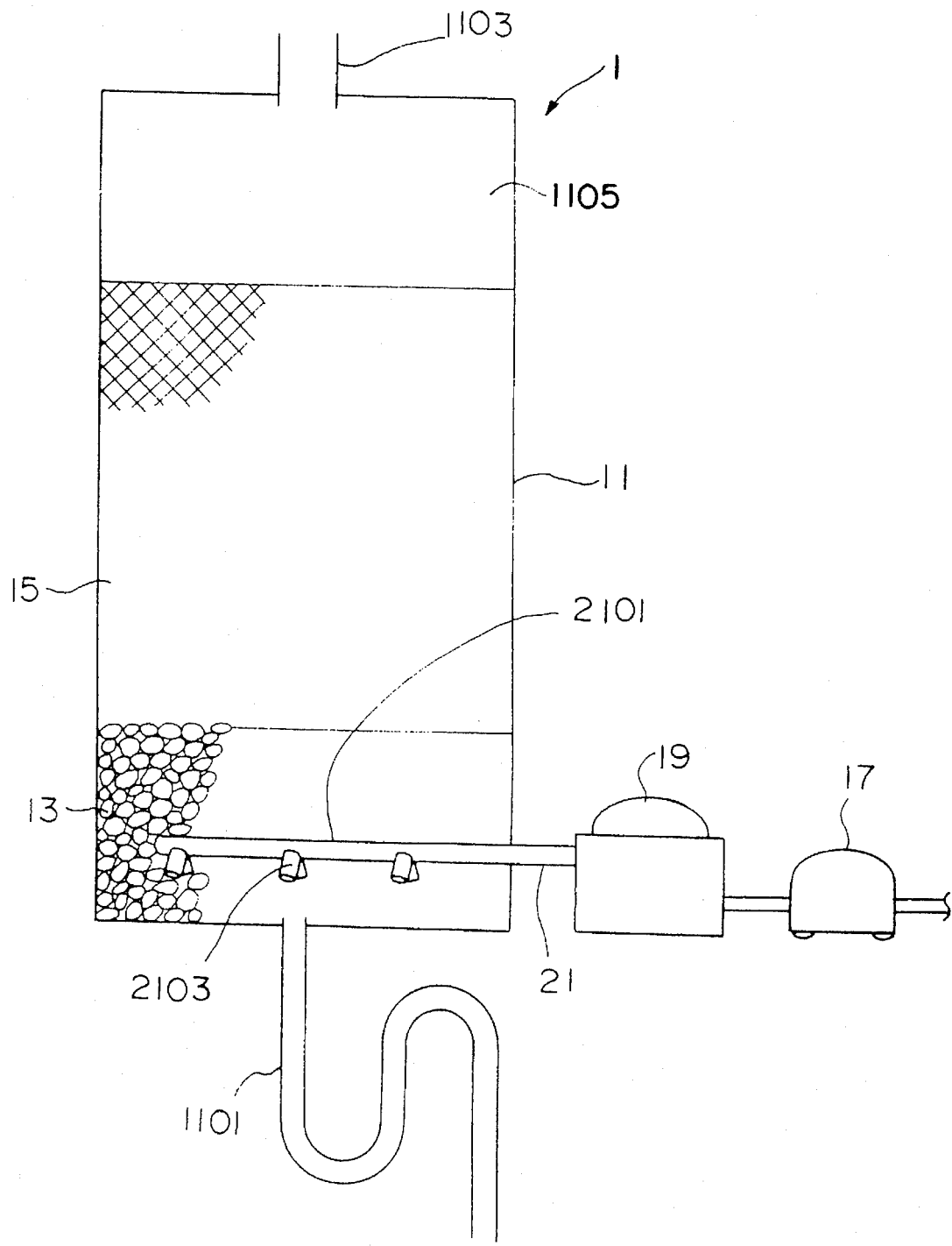
FIG. 1 is a schematic cross-sectional view of a contaminated air purifying apparatus according to a first embodiment of the present invention.

As shown in FIG. 1, a contaminated air purifying apparatus 1 according to a first embodiment of the present invention generally comprises a container 11 housing therein a permeable layer 13 and a soil layer 15, an air pump 17, and an ultrasonic humidifier 19.

The container 11 comprises a hollow cylinder made of acrylic resin and having a vertical axis. The container 11 includes a lower end panel connected to a drain pipe 1101 for discharging water from the container 11, and an upper end panel having an outlet port 1103 for discharging air from the container 11.

Figure 2:
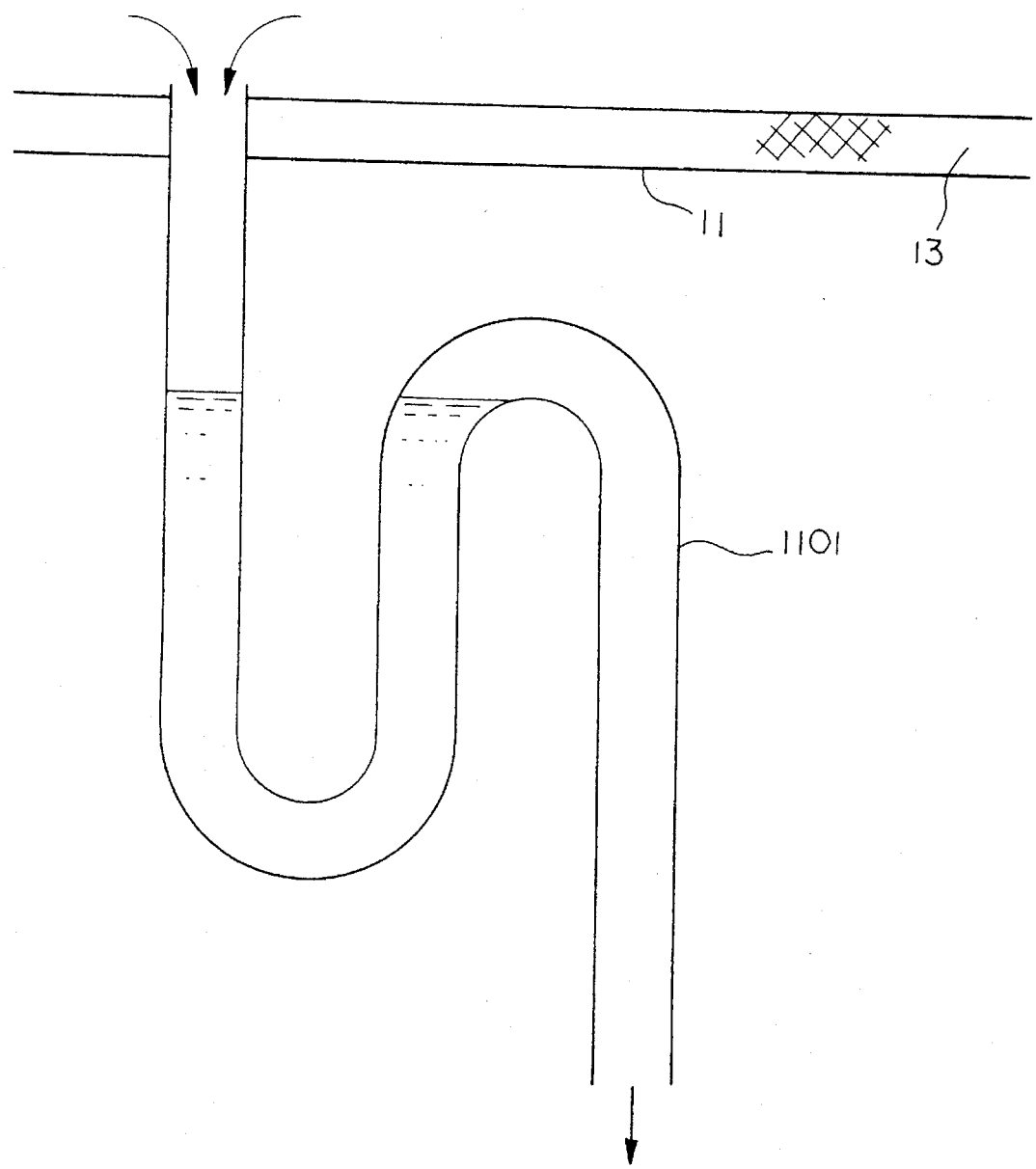
FIG. 2 is an enlarged fragmentary cross-sectional view of a drain pipe of the contaminated air purifying apparatus shown in FIG. 1.

As shown in FIG. 2, the drain pipe 1101 has a portion which is of a substantially S shape serving as a water seal trap.

The permeable layer 13 comprises a layer of gravel having a predetermined vertical thickness and placed on the lower panel of the container 11.

The soil layer 15 comprises a layer of soil for populating microorganisms therein, e.g., a layer of andosols, peat moss, and perlite that are mixed at a volume ratio of 3:1:1 with a high rate of porosity or voidage. The soil layer 15 has a predetermined vertical thickness and placed on the permeable layer 13.

An air chamber 1105 is defined in an upper end portion of the container 11, i.e., between the upper end panel of the container 11 and the upper surface of the soil layer 15.

The air pump 17 (air supply means) serves to supply air to the container 11. The ultrasonic humidifier 19 serves to humidify air delivered by the air pump 17, and is connected between the air pump 17 and the container 11. Air delivered by the air pump 17 is humidified by the ultrasonic humidifier 19, and then introduced through an air inlet pipe 21 into the permeable layer 13 in the container 11.

The air inlet pipe 21 has a pipe portion 2101 extending horizontally substantially fully in the permeable layer 13 and having a plurality of air outlet ports 2103 which are spaced at certain intervals and directed downwardly toward the lower end panel of the container 11.

Operation of the contaminated air purifying apparatus 1 and air purification by the soil layer 15 will be described below.

When contaminated air is delivered to the ultrasonic humidifier 19 by the air pump 17, water contained in a tank combined with the ultrasonic humidifier 19 is atomized by the known ultrasonic vibrating action, and the atomized water is mixed with the contaminated air thereby humidify the contaminated air.

The humidified contaminated air is then introduced through the air inlet pipe 21 into the permeable layer 13 in the container 11.

When the humidified contaminated air passes through the permeable layer 13, a portion of the humidity contained in the humidified contaminated air is condensed, and the condensed water is held in the permeable layer 13 and then discharged from the permeable layer 13 through the drain pipe 1101.

When the condensed water discharged from the permeable layer 13 through the drain pipe 1101, the water is stored in the drain pipe 1101 by a quantity commensurate with the vertical dimension of the S-shaped trap of the drain pipe 1101. The stored water in the drain pipe 1101 is effective to keep the static pressure in the permeable layer 13 below a predetermined pressure level.

If the static pressure in the permeable layer 13 increases beyond the predetermined pressure level, then an amount of contaminated air which corresponds to the increase n the static pressure is released from the permeable layer 13 through the drain pipe 1101, thereby preventing the air pump 17 from being unduly overloaded.

The humidified contaminated air supplied to the permeable layer 13 flows upwardly and passes through the soil Layer 15. When the humidified contaminated air passes through the soil layer 15, the humidified contaminated air is filtered by the soil layer 15, which traps dust particles in the contaminated air and adsorbs impurities or noxious gases including hydrocarbon gases such as methane in the contaminated air.

The microorganisms contained in the soil layer 15 degrade or decompose those impurities or noxious gases.

Specifically, aerobic microorganisms are populated on the surface of the soil layer 15 and in regions of the soil layer 15 where air flows, and anaerobic microorganisms are populated in regions of the soil layer 15 where no air flows. When the contaminated air is consumed or inhaled by the microorganisms, the microorganisms chemically transform or degrade various contaminant gases in the contaminated air, e.g., carbon monoxide into carbon dioxide, and methane into carbon dioxide and water. In this manner various contaminants contained in the contaminated air are removed by the soil layer 15.

When the contaminated air flows through the soil layer 15, since the contaminated air has already been humidified by the ultrasonic humidifier 19, the moisture contained in the soil layer 15 is not absorbed by the contaminated air.

Accordingly, the soil layer 15 is prevented from being dried, and the temperature of the soil layer 15 is also prevented from being lowered because the soil layer 15 is not deprived of latent heat by the contaminated air as the moisture contained in the soil layer 15 is not vaporized. As a result, the moisture and temperature of the soil layer 15 are kept at a suitable level.

In the contaminated air purifying apparatus 1, as described above, the contaminated air is humidified by the ultrasonic humidifier 19 and thereafter passed through the soil layer 15. Therefore, when the contaminated air flows through the soil layer 15, the moisture contained in the soil layer 15 is not absorbed by the contaminated air, and the soil layer 15 is not deprived of latent heat by the contaminated air and hence the temperature of the soil layer 15 is prevented from being lowered. Even if the humidity of the contaminated air is low, the function of the microorganisms and the soil layer 15 to purify the contaminated air can efficiently be performed.

The permeable layer 13 of the contaminated air rifying apparatus 1 may be dispensed with, but should preferably be employed in order to remove excessive humidity from the contaminated air that has been humidified by the ultrasonic humidifier 19 and also to prevent the microorganisms in the soil layer 15 from being adversely affected by any excessive moisture which would otherwise be imparted from the contaminated air to the soil layer 15.

The principles of the first embodiment are applicable to the removal of various noxious or toxic contaminants in various exhaust gases such as exhaust gases from underground parking lots, tunnels for automobiles, etc., or desulfurized or denitrified exhaust gases emitted from exhaust gas processing facilities associated with plants or factories which have combustion devices such as boilers or the like.

[Experimental Example 1]

An experiment in which the contaminated air purifying apparatus 1 shown in FIG. 1 was used for purifying contaminated air will be described below.

Figure 3:
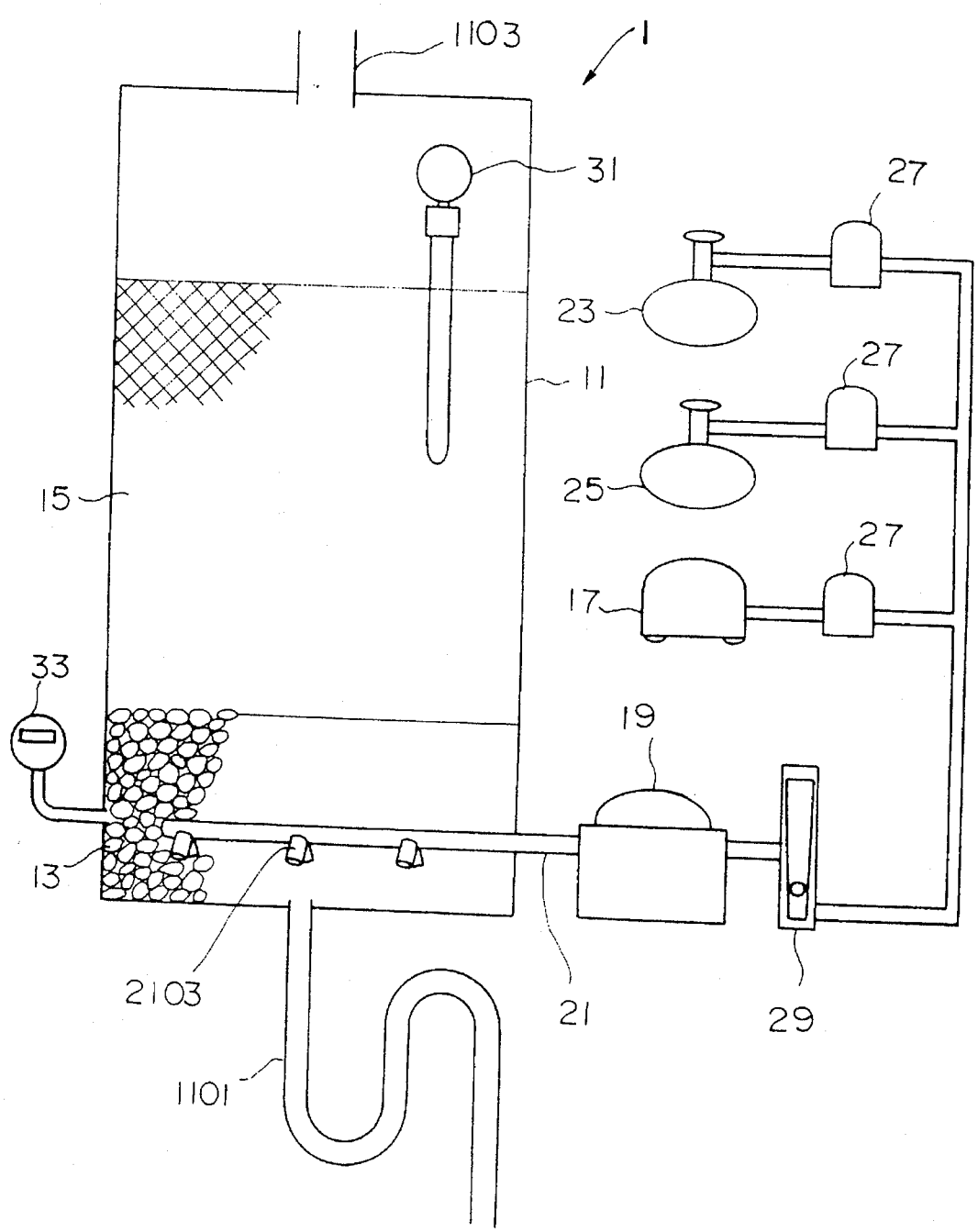
FIG. 3 is a schematic cross-sectional view of an experimentation system which is composed of the contaminated air purifying apparatus shown in FIG. 1 and peripheral devices connected thereto, for carrying out an experiment to purify contaminated air.

FIG. 3 shows an experimentation system which is composed of the contaminated air purifying apparatus 1 shown in FIG. 1 and peripheral devices connected thereto. Dimensions of the components of the contaminated air purifying apparatus 1, experimental conditions, and the peripheral devices connected to the contaminated air purifying apparatus 1 will be described below.

In FIG. 3, the container 11 had an inside diameter of 36 cm and a height of 80 cm. The permeable layer 13 was composed of a layer of gravel having an average diameter of about 1 cm and had a thickness of 15 cm. The soil layer 15 was composed of a mixed layer of andosols, peat moss, and perlite.

The S-shaped water seal trap of the train pipe 1101 had a vertical dimension or height of 200 mm for keeping a static pressure of 200 mmAq or below within the permeable layer 13.

The ultrasonic humidifier 19 was supplied with atmospheric air from the air pump 17, and also with carbon monoxide and nitrogen dioxide respectively from a carbon monoxide container 23 and a nitrogen dioxide container 25. The rates of flow of the atmospheric air, the carbon monoxide, and the carbon dioxide respectively from the air pump 17, the carbon monoxide container 23, and the nitrogen dioxide container 25 were controlled by respective mass flow controllers 27 connected respectively thereto to supply pseudo-contaminated air to the ultrasonic humidifier 19.

A float-type flowmeter 29 for measuring the rate of flow of the pseudo-contaminated air supplied to the ultrasonic humidifier 19 was connected between the ultrasonic humidifier 19 and the mass flow controllers 27. A soil moisture meter 31 for measuring the moisture (pF) of the soil layer 15 was inserted in an upper portion of the soil layer 15, and a static pressure meter 33 for measuring the static pressure in the permeable layer 13 was connected to the lower portion of the container 11 which houses the permeable layer 13.

In the experiment, the pseudo-contaminated air was supplied to the ultrasonic humidifier 19 at a flow rate of 60 liters/minute. The carbon monoxide contained in the pseudocontaminated air had a concentration (hereinafter referred to as a "CO initial gas concentration") of 30.0 ppm, and the nitrogen dioxide contained in the pseudo-contaminated air had a concentration (hereinafter referred to as a "$NO_2$ initial gas concentration") of 0.80 ppm. The experiment was carried out for removal of carbon monoxide and nitrogen dioxide in a mode "A" in which the pseudo-contaminated air was not humidified by the ultrasonic humidifier 19 and a mode "B" in which the pseudo-contaminated air was humidified by the ultrasonic humidifier 19.

The experiment was conducted continuously for 20 days in each of the modes "A", "B", and the moisture of the soil layer 15 (soil moisture), the concentration of carbon monoxide in the air in the air chamber 1105 (hereinafter referred to as a "CO final gas concentration"), the concentration of nitrogen dioxide in the air in the air chamber 1105 (hereinafter referred to as a "$NO_2$ final gas concentration"), and the static pressure in the permeable layer 13 were measured on the 1st, 5th, 10th, 15th, and 20th days of the experiment. The measured data are shown in FIGS. 4 and 5.

FIG. 4 shows the results of the experiment in the mode "A", and FIG. 5 shows the results of the experiment in the mode "B".

The experimental results shown in FIGS. 4 and 5 indicate that in the mode "A", the soil moisture was reduced, the carbon monoxide removal ratio on the 20th day was 16%, and the nitrogen dioxide removal ratio on the 20th day was 23 whereas in the mode "B", the soil moisture was kept substantially constant, the carbon monoxide removal ratio on the 20th day was 83% and the nitrogen dioxide removal ratio on the 20th day was 84%. As a consequence, it was found that the contaminated air purifying apparatus 1 was effective in removing carbon monoxide and nitrogen dioxide from contaminated air.

[2nd Embodiment]

Figure 6:
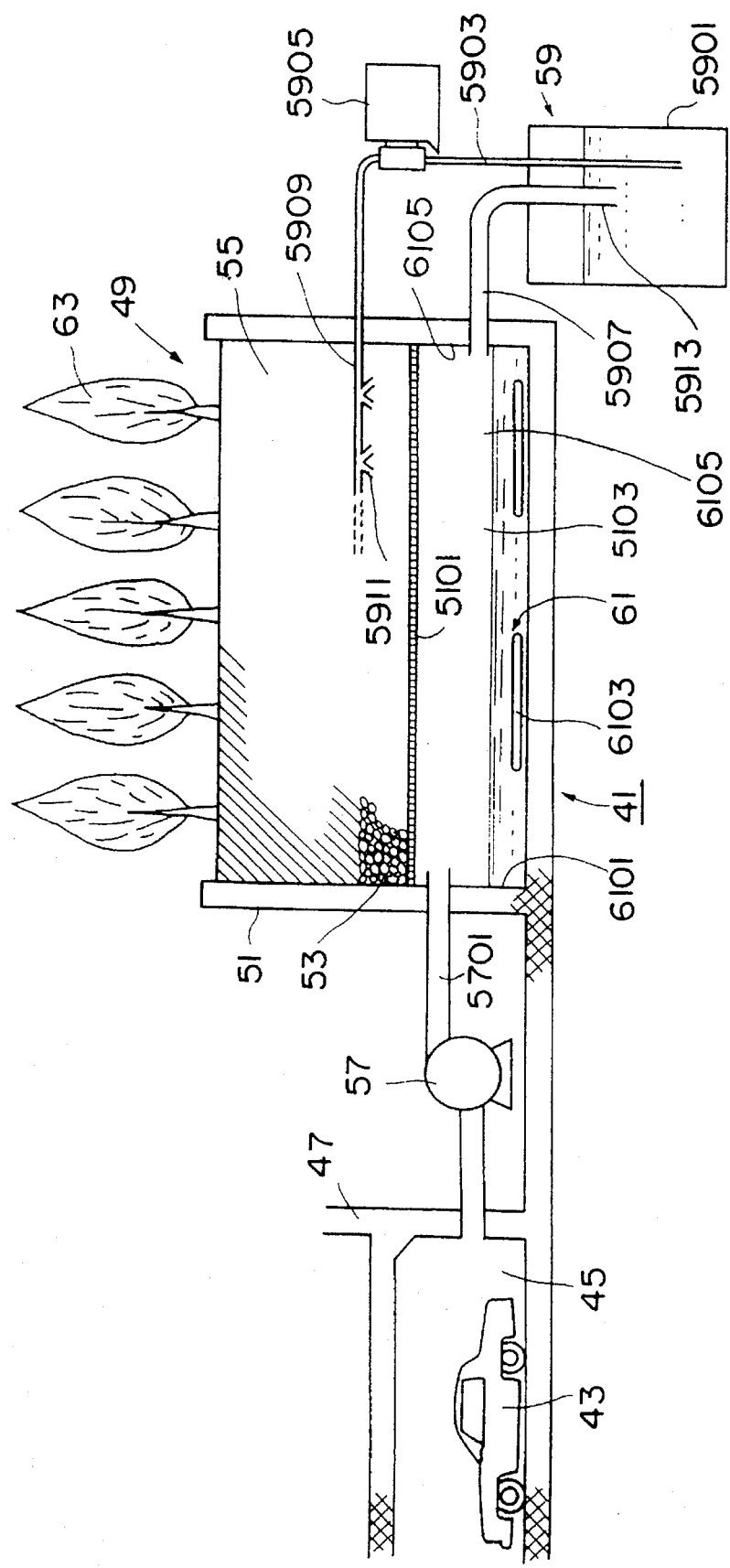
FIG. 6 is a schematic cross-sectional view of a contaminated air purifying apparatus according to a second embodiment of the present invention.

FIG. 6 shows a contaminated air purifying apparatus 41 according to a second embodiment of the present invention.

As shown in FIG. 6, the contaminated air purifying apparatus 41 is typically employed to purify contaminated air in an underground parking lot 45 that is capable of handling about 20 automobiles 43 as they go into and out of the underground parking lot 45 at all times. The contaminated air purifying apparatus 41 is combined with a planted landscape 49 located in the vicinity of a building 47 which has the underground parking lot 45.

The contaminated air purifying apparatus 41 generally comprises a container 51 housing therein a permeable layer 53 and a soil layer 55, an air pump 57, a water supply 59, and a heating section 61.

The container 51 has an upper opening having an area of about 21 m$^2$. A metallic mesh 5101 made of stainless steel having a mesh size of 5 mm is disposed in the container 51 at a given height, defining a chamber 5103 below the metallic mesh 5101 in the container 51.

The permeable layer 53 comprises a layer of gravel having an average diameter of about 2 cm and a vertical thickness of 20 cm and placed on the metallic mesh 5101 in the container 5101.

The soil layer 55 comprises a layer of soil for populating microorganisms therein, e.g., a layer of andosols, peat moss, and perlite that are mixed at a volume ratio of 3:1:1 with a high rate of porosity or voidage. The soil layer 15 also includes a small amount of leaf mold and compost. The soil layer 55 has a vertical thickness of 50 cm and is placed on the permeable layer 53 in the container 5101.

The andosols, which is a main constituent of the soil layer 55, contains a rich population of soil microorganisms. The peat moss is used to grow the soil microorganisms. The perlite is used to increase the voidage of the soil layer 45 and make the soil layer 45 highly permeable to water and air.

Trees 63 are planted in the soil layer 55. The container 51, the permeable layer 53, the soil layer 55, and the trees 63 jointly make up the planted landscape 49.

The air pump 57 (air supply means) serves to supply contaminated air from the underground parking lot 45 to the chamber 5103 in the container 51 through a discharge pipe 5701.

The water supply 59 (water supply means) has a water tank 5901, a supply pipe 5903, a water pump 5905, and an overflow pipe 5907.

The water tank 5901 is connected to a water supply system and stores water. The level of water in the water tank 5901 is kept constant by a ball tap or the like (not shown).

The supply pipe 5903 extends from the water tank 5901 to the container 51, and has a portion 5909 extending in the container 51 over the upper surface of the permeable layer 53 and having a plurality of outlet ports 5911 which are spaced at certain intervals and directed downwardly toward the permeable layer 53.

The water pump 5905 is connected to the supply pipe 5903 between the water tank 5901 and the container 51, and can be actuated for a certain period of time under the control of a timer switch (not shown) to supply a certain amount of water from the water tank 5901 through the water pipe 5903 to the permeable layer 53.

The overflow pipe 5907 extends from the container 51 at a vertically intermediate portion of the chamber 5103 to the water tank 5901, and has a distal end 5913 extending downwardly into the water tank 5901 and immersed in the water in the water tank 5901 at a depth of 20 mm below the water level therein.

The overflow pipe 5907 connected between the chamber 5103 and the water tank 5901 is effective to keep the static pressure in the chamber 5103 at 200 mmAq. If the static pressure in the chamber 5103 exceeds 200 mmAq, then air in the chamber 5103 is released through the overflow pipe 5907 into the water tank 5901.

The heating section 61 (heating means) comprises a receptacle 6101 defined by a portion of the container 51 below the position on the chamber 5103 where the overflow pipe 5907 is connected, a heater 6103 disposed in the receptacle 6101, and an introducing section 6105 defined by a portion of the container 51 above the position on the chamber 5103 where the overflow pipe 5907 is connected.

The receptacle 6101 serves to store water flowing downwardly from the permeable layer 53 through the metallic mesh 5101. Water that has overflowed the receptacle 6101 is released through the overflow pipe 5907 into the water tank 901.

The heater 6103 serves to heat the water in the receptacle 6101 to a temperature of 35° C at all times under the control of a thermostat (not shown).

The introducing section 6105 serves to introduce a water vapor or steam produced from the water in the receptacle 6101 by the heater 6103, through the metallic mesh 5101 and the permeable layer 53 into the soil layer 55.

Operation of the contaminated air purifying apparatus 41 and air purification by the soil layer 55 will be described below.

When contaminated air is introduced from the underground parking lot 45 through the discharge pipe 5701 into the chamber 5103 by the air pump 57, the contaminated air is introduced through the metallic mesh 5101 and the permeable layer 53 into the soil layer 55 unless the static pressure in the chamber 5103 exceeds 200 mmAq.

Upon passage of the contaminated air through the soil layer 55, the contaminated air is filtered by the soil layer 55, which traps dust particles in the contaminated air and adsorbs impurities or noxious gases including hydrocarbon gases such as methane in the contaminated air.

The microorganisms contained in the soil layer 55 degrade or decompose those impurities or noxious gases.

Specifically, aerobic microorganisms are populated on the surface of the soil layer 55 and in regions of the soil layer 55 where air flows, and anaerobic microorganisms are populated in regions of the soil layer 55 where no air flows. When the contaminated air is consumed or inhaled by the microorganisms, the microorganisms chemically transform or degrade various contaminant gases in the contaminated air, e.g., carbon monoxide into carbon dioxide, and methane into carbon dioxide and water. In this manner, various contaminants contained in the contaminated air are removed by the soil layer 55.

The permeable layer 53 is supplied uniformly in its entirety with water from the water tank 5901 through the water pipe 5903 at a constant rate per unit of time, so that the permeable layer 53 is kept at a certain moisture level.

When the contaminated air passes through the permeable layer 53, the contaminated air absorbs moisture contained in the permeable layer 53 and hence contains a suitable level of humidity. When the contaminated air then passes through the soil layer 55, since the contaminated air has already been humidified, the contaminated air does not absorb moisture contained in the soil layer 55.

Therefore, the soil layer 55 is prevented from being dried, and the temperature of the soil layer 55 is also prevented from being lowered because the soil layer 55 is not deprived of latent heat by the contaminated air as the moisture contained in the soil layer 55 is not vaporized. As a result, the moisture and temperature of the soil layer 55 are kept at a suitable level. The soil layer 55 populated with microorganisms is maintained under optimum conditions for efficiently purifying the contaminated air.

The water supplied to the permeable layer 53 by the water pump 5905 drops by gravity through the permeable layer 3 and the metallic mesh 5101 into the chamber 5103, and is stored in the receptacle 6101.

The water stored in the receptacle 6101 is heated by the heater 6103, and generates a warm water vapor or steam, which is introduced through the introducing section 6105, the metallic mesh 5101, and the permeable layer 53 into the soil layer 55.

The warm steam thus introduced warms the soil layer 55 is also effective to keep the temperature of the soil layer 55 at an appropriate level for thereby maintaining the soil layer 55 populated with microorganisms under optimum conditions for efficiently purifying the contaminated air.

The contaminated air purifying apparatus 41 was continuously operated for 100 days to remove carbon monoxide and nitrogen dioxide from the contaminated air in the underground parking lot 45. The average carbon monoxide removal ratio was about 90% and the average nitrogen dioxide removal ratio was about 80%.

Since the contaminated air purifying apparatus 41 was combined with the planted landscape 49, the static pressure in the chamber 5103 temporarily increased upon a rainfall, but did not exceed 200 mmAq.

Figure 7:
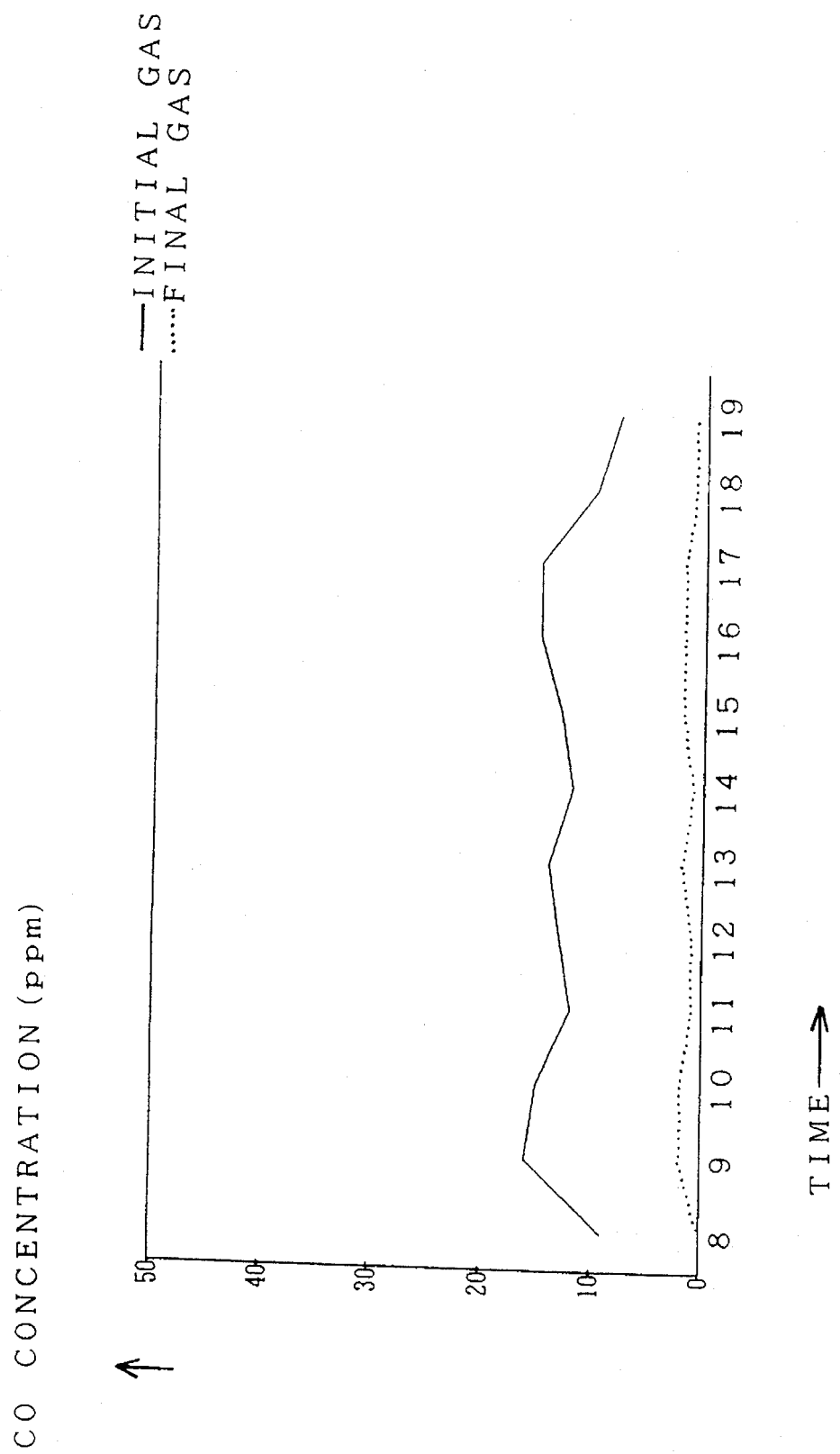
FIG. 7 is a diagram showing the concentrations of carbon monoxide in initial and final gases, respectively, as they vary with time, the concentrations being measured on the one-hundredth day of a continuous operation period of the contaminated air purifying apparatus shown in FIG. 6.
Figure 8:
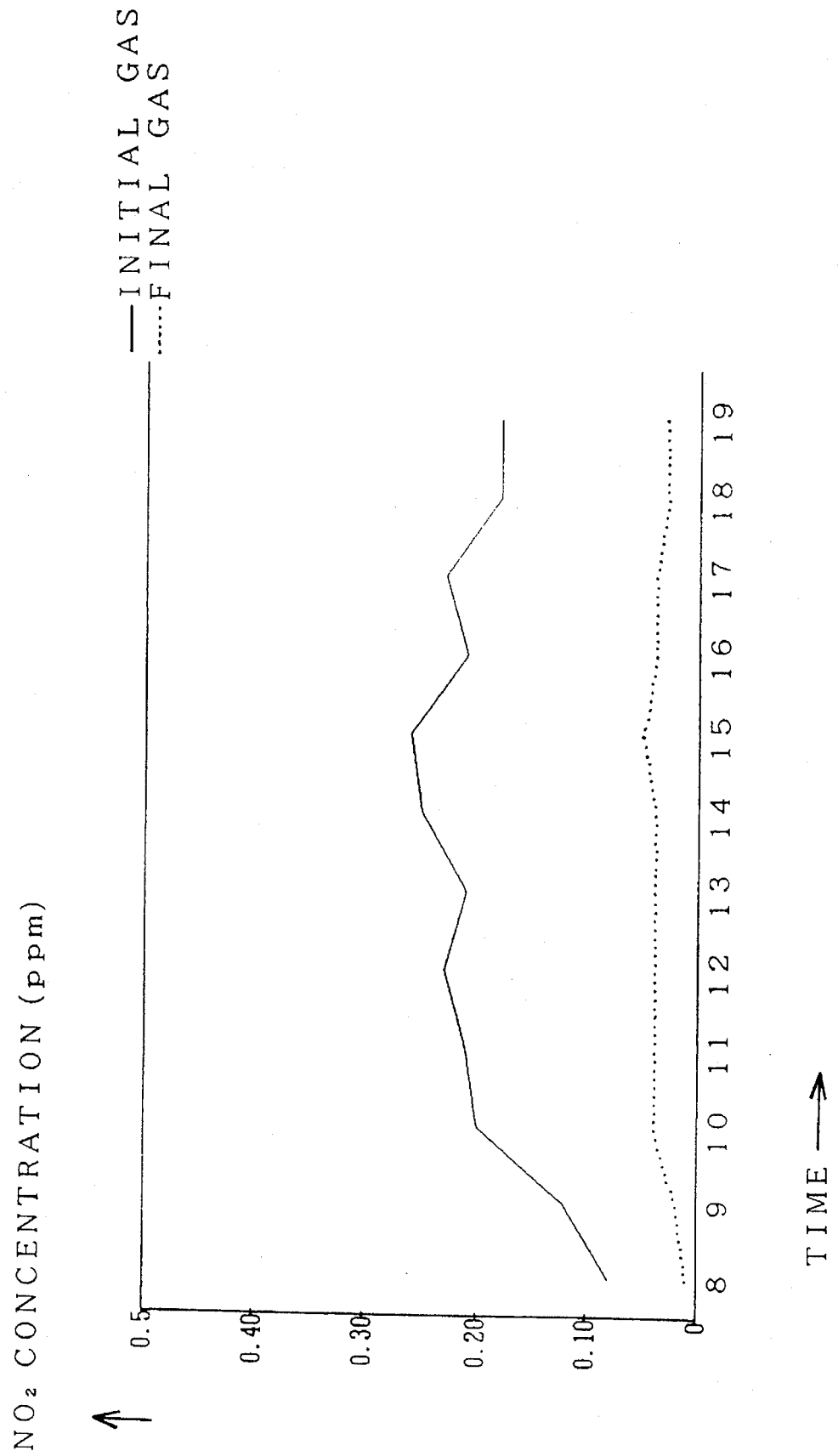
FIG. 8 is a diagram showing the concentrations of nitrogen dioxide in initial and final gases, respectively, as they vary with time, the concentrations being measured on the one-hundredth day of a continuous operation period of the contaminated air purifying apparatus shown in FIG. 6.

On the one-hundredth day of the continuous operation of the contaminated air purifying apparatus 41, the contaminated air (initial gas) in the chamber 5103 and the air (final gas) having passed through the soil layer 55 were measured continuously from 8 o'clock in the morning to 7 o'clock in the evening for the concentrations of carbon monoxide and nitrogen dioxide. The measured concentrations of carbon monoxide and nitrogen dioxide are shown in FIGS. 7 and 8, and indicate that carbon monoxide and nitrogen dioxide contained in the contaminated air in the underground parking lot 45 were substantially fully removed by the contaminated air purifying apparatus 41.

In the contaminated air purifying apparatus 41, as described above, the moisture in the soil layer 55 is adjusted by water supplied from the water supply 59 to the permeable layer 53, and the soil layer 55 is warmed for adjusting its temperature by the heating of the water in the receptacle 6101 by the heater 6103 of the heating section 61. Therefore, the soil layer 55 populated with microorganisms is humidified and warmed to keep its temperature and moisture at a suitable level, and hence maintained under optimum conditions for efficient purification of the contaminated air.

In the second embodiment, the heating section 61 for producing a warm water vapor or steam to indirectly warm the soil layer 55 may be dispensed with or replaced with a heater that may be disposed in either the soil layer 55 or an inner wall of the container 51 which is held in contact with the soil layer 55, for directly heating the soil layer 55.

The structures and ratios of constituents of the permeable layer 53 and the soil layer 55 may be modified depending on the environmental conditions in which the contaminated air purifying apparatus 41 is installed.

The trees 63 planted in the soil layer 55 may be dispensed with, but should preferably be retained for activating the microorganisms in the soil layer 55.

The principles of the second embodiment are applicable to the removal of various noxious or toxic contaminants in various exhaust gases such as exhaust gases from underground parking lots, tunnels for automobiles, etc., or desulfurized or denitrified exhaust gases emitted from exhaust gas processing facilities associated with plants or factories which have combustion devices such as boilers or the like.

[Experimental Example 2]

An experiment in which the principles of the contaminated air purifying apparatus 41 shown in FIG. 6 were used for purifying contaminated air will be described below.

Figure 9:
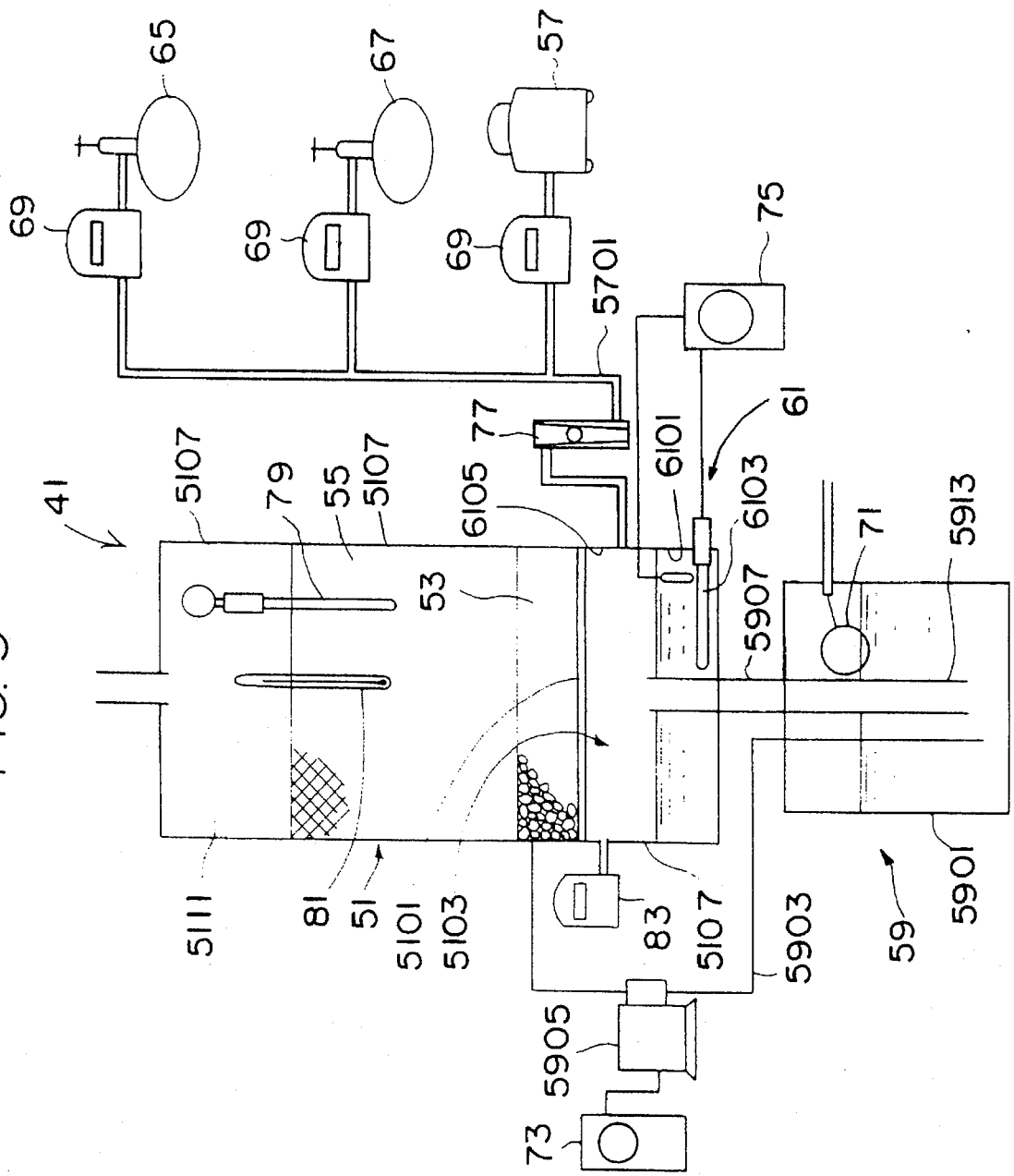
FIG. 9 is a schematic cross-sectional view of an experimentation system which is composed of the contaminated air purifying apparatus shown in FIG. 6 and peripheral devices connected thereto.

FIG. 9 shows an experimentation system which is composed of a contaminated air purifying apparatus that is essentially the same as the contaminated air purifying apparatus 41 shown in FIG. 6 and peripheral devices connected thereto. Those parts of the contaminated air purifying apparatus shown in FIG. 9 which are identical or correspond to those of the contaminated air purifying apparatus 41 shown in FIG. 6 are denoted by identical or corresponding reference numerals, and will not be described in detail below.

Figure 10:
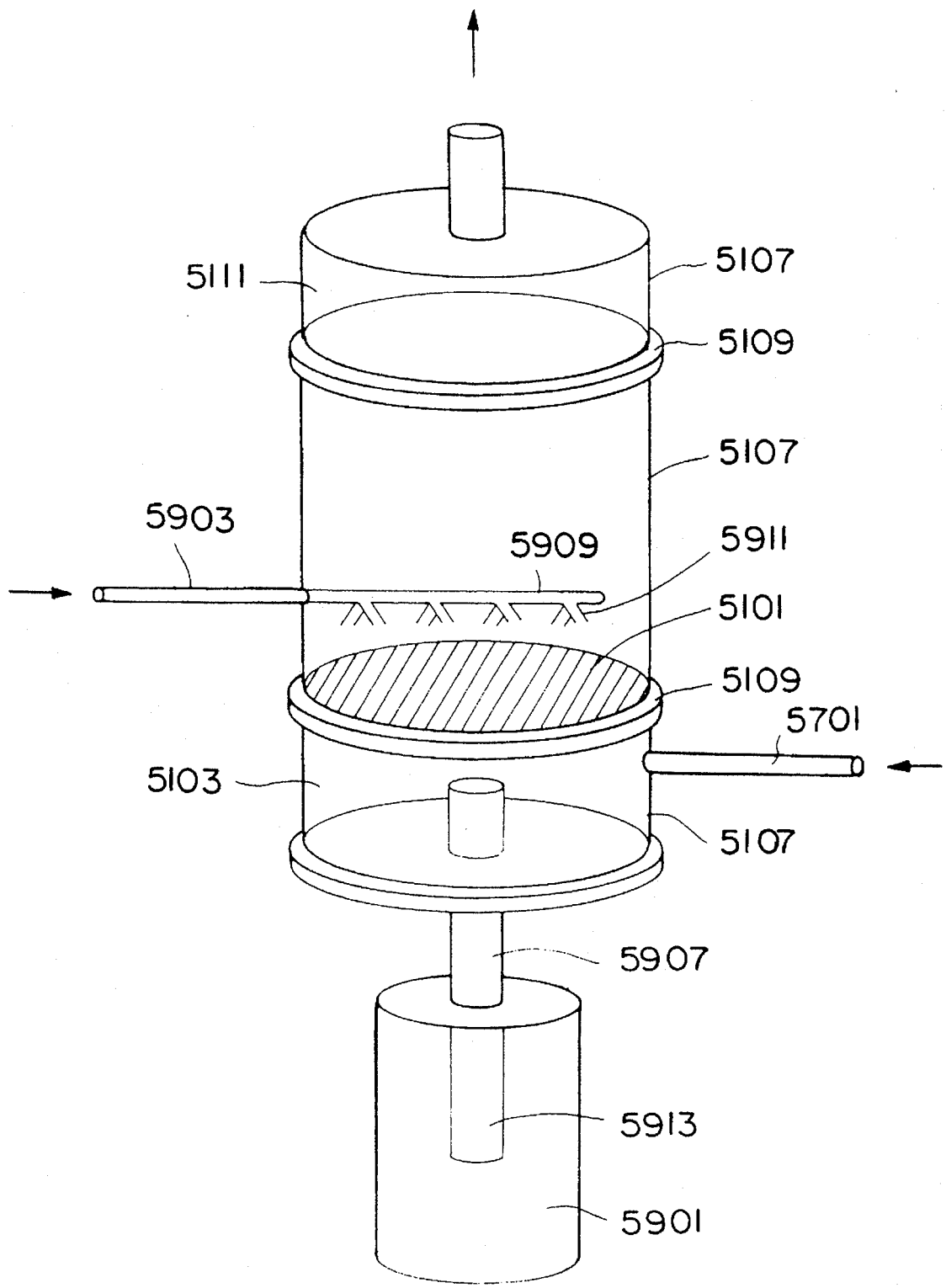
FIG. 10 is a perspective view of a tank of the contaminated air purifying apparatus shown in FIG. 6.

In the contaminated air purifying apparatus shown in FIG. 9, which is generated denoted by 41, the container 51 was composed of a hollow cylinder of acrylic resin having an inside diameter of 36 cm and a height of 100 cm with disks of acrylic resin being fused respectively to the upper and lower ends of the hollow cylinder. As shown in FIG. 10, the container 51 was separable at the upper end of the soil layer 55 and the lower end of the metallic mesh 5101 into three container sections, i.e., and upper, central, and lower container sections, 5107a, 5107b, 5107c and these three container sections were joined by flanges 5109a, and 5109b.

Figure 11:
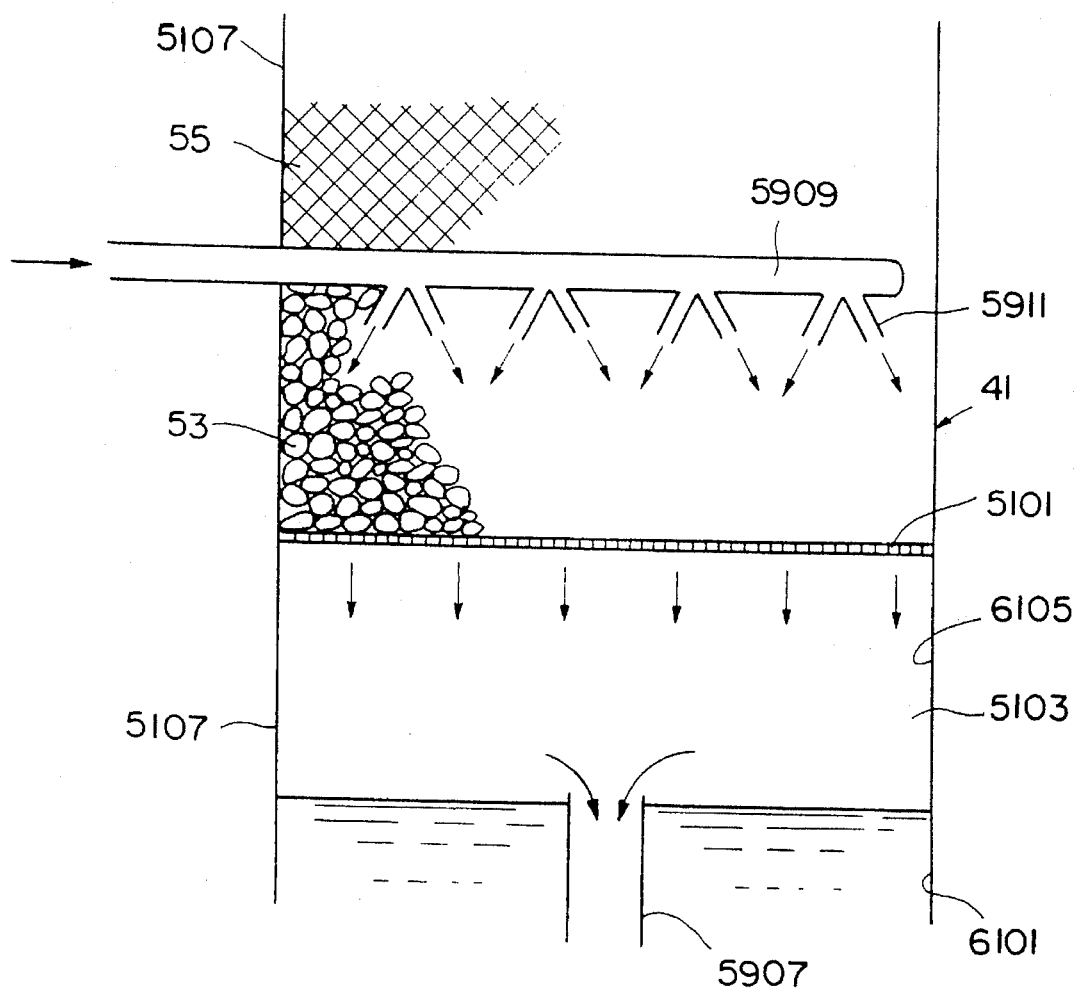
FIG. 11 is a schematic fragmentary cross-sectional view of structural details in the tank of the contaminated air purifying apparatus shown in FIG. 6.

The metallic mesh 5101 was made of stainless steel and had a mesh size of 3 mm. The permeable layer 53 comprised a layer of gravel having an average diameter of about 1 cm and a vertical thickness of 10 cm and placed on the metallic mesh 5101 in the container 5101. The soil layer 55 comprised a layer of andosols, peat moss, and perlite that were mixed at a volume ratio of 3:1:1, and had a vertical thickness of 40 cm. As shown in FIG. 11, the permeable layer 53 and the soil layer 55 were housed in the central container section 5107, and an upper chamber 5111 was defined in the upper container section 5107.

The structure and ratios of constituents of the soil layer 55 were determined after their water and air permeabilities were experimentally confirmed.

The discharge pipe 5701 was supplied with atmospheric air from the air pump 57 and also with carbon monoxide and nitrogen dioxide respectively from a carbon monoxide container 65 and a nitrogen dioxide container 67. The rates of flow of the atmospheric air, the carbon monoxide, and the nitrogen dioxide were controller by mass flow controllers 69 to supply pseudo-contaminated air to the chamber 5103.

The water level in the water tank 5901 was kept constant by a ball tap 71. A period of operation of the water pump 5905 was controlled by a timer switch 73. The temperature to which the water in the receptacle 5905 was heated by the heater 6103 was controlled by a thermostat 75.

Figure 12:
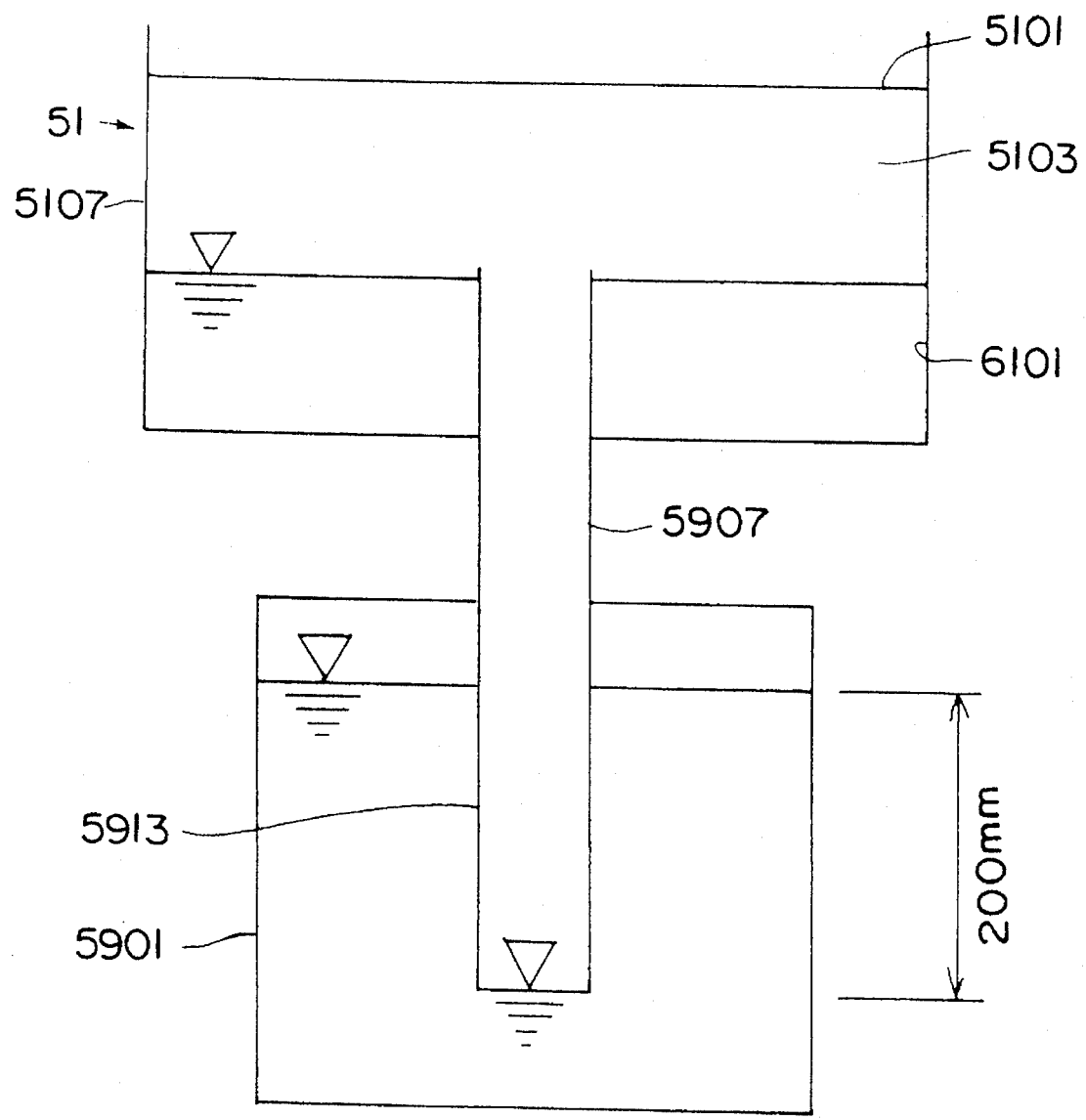
FIG. 12 is a schematic fragmentary cross-sectional view of a water supply of the contaminated air purifying apparatus shown in FIG. 6.

As shown in FIG. 12, the water tank 5901 was positioned below the container 51, and the distal end 5913 of the overflow pipe 5907 was immersed in the water in the water tank 5901 at a depth of 200 mm from the water level therein for thereby keeping the static pressure in the chamber 5103 at 200 mmAq.

As shown in FIG. 9, a float-type flowmeter 77 for measuring the rate of flow of the pseudo-contaminated air supplied to the chamber 5103 was connected to the discharge pipe 5701 downstream of the air pump 57 between the container 51 and the mass flow controllers 69. A soil moisture meter 79 for measuring the moisture (pF) of the soil layer 55 and a rod-shaped thermometer 81 for measuring the temperature of the soil layer 55 were inserted in an upper portion of the soil layer 55, and a static pressure meter 83 for measuring the static pressure in the chamber 5103 was connected to the portion of the container 51 which serves as the introducing section 6105.

In the experiment, the pseudo-contaminated air was supplied to the chamber 5103 at a flow rate of 60 liters/minute. The carbon monoxide contained in the pseudocontaminated air had a concentration (hereinafter referred to as a "CO initial gas concentration") of 30.0 ppm, and the nitrogen dioxide contained in the pseudo-contaminated air had a concentration (hereinafter referred to as a "$NO_2$ initial gas concentration") of 0.80 ppm. The experiment was carried out for removal of carbon monoxide and nitrogen dioxide in a mode "A", a mode "B", and a mode "C" which are defined as follows:

(1) Mode "A":

No water was supplied from the water supply 59 to the permeable layer 53, and the water in the receptacle 6101 was not heated by the heating section 61.

(2) Mode "B":

Water was supplied from the water supply 59 to the permeable layer 53 at a rate of about 200 milliliters for five minutes per hour, and the water in the receptacle 6101 was not heated by the heating section 61.

(3) Mode "C":

Water was supplied from the water supply 59 to the permeable layer 53 at a rate of about 200 milliliters for five minutes per hour, and the water in the receptacle 6101 was heated to 35° C. by the heating section 61.

The experiment was conducted continuously for 20 days in each of the modes "A", "B", "C" and the moisture of the soil layer 55 (soil moisture), the temperature of the soil layer 55 (soil temperature), the concentration of carbon monoxide in the air in the upper chamber 5111 (hereinafter referred to as a "CO final gas concentration"), the concentration of nitrogen dioxide in the air in the upper chamber 5111 (hereinafter referred to as a "$NO_2$ final gas concentration", and the static pressure in the chamber 5103 were measured on the 1st, 5th, 10th, 15th, and 20th days of the experiment. The measured data are shown in FIGS. 13 through 15.

FIG. 13 shows the results of the experiment in the mode "A", FIG. 14 shows the results of the experiment in the mode "B", and FIG. 15 shows the results of the experiment in the mode "C".

The experimental results shown in FIGS. 13 through 15 indicate that in the mode "A", the carbon monoxide removal ratio on the 20th day was 17% and the nitrogen dioxide removal ratio on the 20th day was 15% whereas in the mode "B", the carbon monoxide removal ratio on the 20th day was 77 and the nitrogen dioxide removal ratio on the 20th day was 66% and in the mode "C", the carbon monoxide removal ratio on the 20th day was 89%, and the nitrogen dioxide removal ratio on the 20th day was 85%. As a consequence, it was found that the soil layer 55 populated with microorganisms is placed under optimum conditions in the contaminated air purifying apparatus 41 was effective in removing carbon monoxide and nitrogen dioxide from contaminated air.

[3rd Embodiment]

Figure 16:
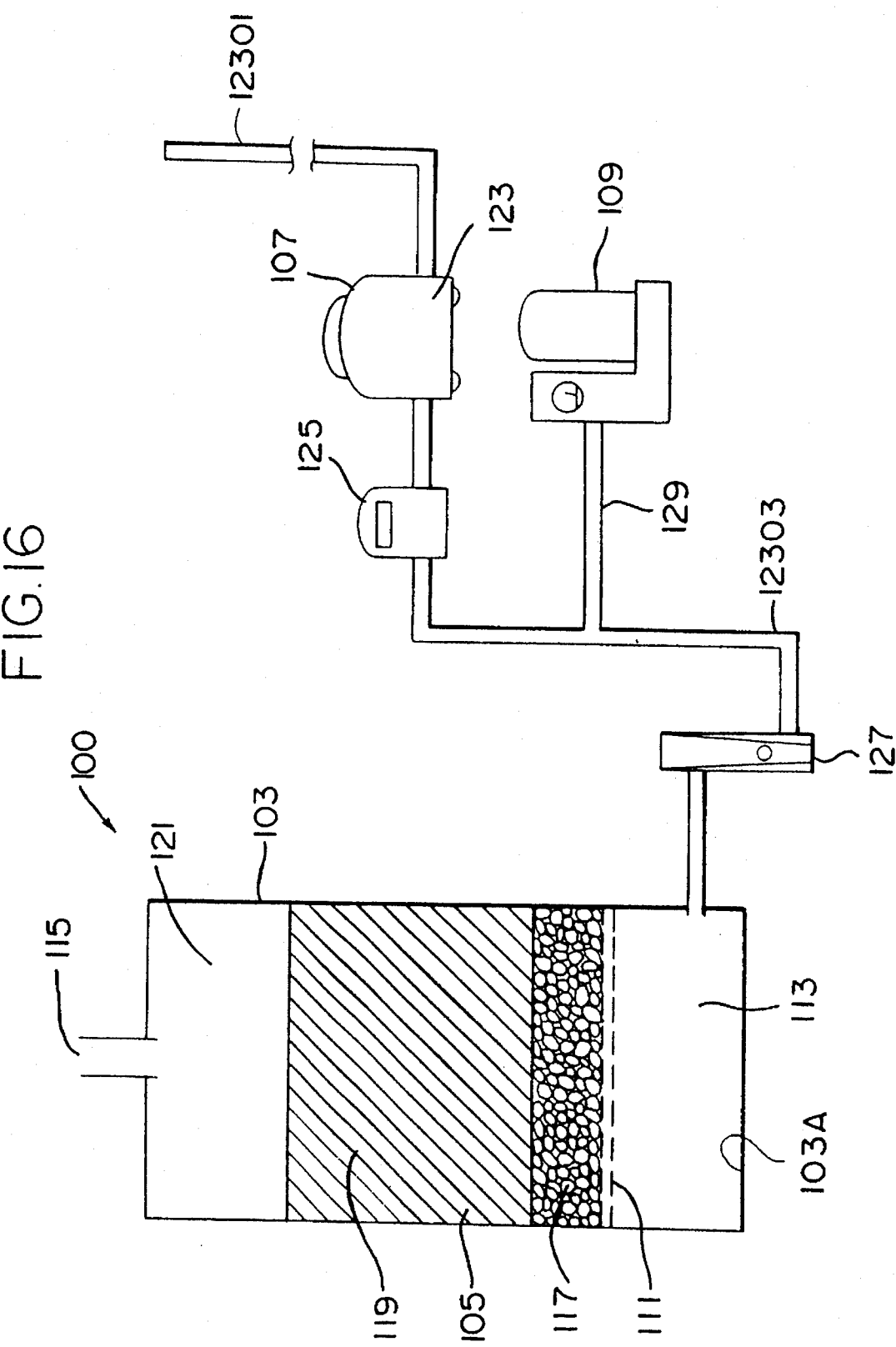
FIG. 16 is a schematic cross-sectional view of a contaminated air purifying apparatus according to a third embodiment of the present invention.

FIG. 16 shows a contaminated air purifying apparatus 100 according to a third embodiment of the present invention.

As shown in FIG. 16, the contaminated air purifying apparatus 100 generally comprises a container 103 housing therein a soil body 105, an air supply means 107 for supplying contaminated air to the soil body 105 and passing the contaminated air through the soil body 105, and an ozonizer 109.

The container 103 comprises a hollow cylinder having a vertical axis, and a mesh 111 such as a metallic mesh is horizontally disposed in the container 103 at a certain height from a lower panel 103A of the container 103, defining a space or chamber 113 between the mesh 111 and the lower panel 103A for introducing contaminated air. The container 103 has an upper end panel having an outlet port 115 for discharging air from the container 103.

The soil body 105 is housed in the container 103 above the mesh 111. In the illustrated embodiment, the soil body 105 comprises a permeable layer 117 disposed on the mesh 111 and a soil layer 119 disposed on the permeable layer 117, and allows air to flow through the permeable layer 117 and the soil layer 119.

The permeable layer 117 comprises a layer of crushed stones. The soil layer 119 comprises a layer of soil for populating microorganisms therein, e.g., a layer composed of andosols as a main constituent and perlite, etc. that are mixed together with a high rate of porosity or voidage. An air space or chamber 121 is defined in an upper end portion of the container 103, i.e., between the upper end panel of the container 103 and the upper surface of the soil layer 119.

The air supply means 107 comprises an air pump 123, for example, having an inlet pipe 12301 extending to a region where contaminated air is to be drawn, and an outlet pipe 12303 connected to the space 113 through a mass flow controller 125 and a float-type flowmeter 127.

The ozonizer 109 generates and supplies ozone through an outlet pipe 129 to the outlet pipe 12303 at a position upstream of the flow-type flowmeter 127 and downstream of the mass flow controller 125.

The contaminated air purifying apparatus 100 operates as follows:

When the air pump 123 is operated, contaminated air is drawn from the inlet pipe 12301, regulated to flow at a constant rate by the mass flow controller 125, and discharged through the flow-type flowmeter 127 from the outlet pipe 12303 into the space 113.

The ozonizer 109 is also actuated to supply ozone from the outlet pipe 129 to the outlet pipe 12303 at a constant rate.

Primarily in the outlet pipe 12303, nitrogen monoxide contained in the contaminated air is transformed into nitrogen dioxide by the supplied ozone, and the produced nitrogen dioxide is delivered under pressure into the space 113.

The contaminated air delivered under pressure into the space 113 then flows upwardly from the permeable layer 117 through the soil layer 119, during which time the contaminated air is purified as described below. The purified air then flows from the surface of the soil layer 119 through the space 121 and the outlet port 115 into the atmosphere.

When the contaminated air passes through the soil body 105, the contaminated air is filtered by the soil body 105, which traps dust particles in the contaminated air and adsorbs impurities or noxious gases including hydrocarbon gases such as methane in the contaminated air.

The microorganisms contained in the soil body 105 degrade or decompose those impurities or noxious gases.

Specifically, aerobic microorganisms are populated on the surface of the soil body 105 and in regions of the soil body 105 where air flows, and anaerobic microorganisms are populated in regions of the soil body 105 where no air flows. When the contaminated air is consumed or inhaled by the microorganisms, the microorganisms chemically transform or degrade various contaminant gases in the contaminated air, e.g., carbon monoxide into carbon dioxide, and methane into carbon dioxide and water.

The nitrogen dioxide that has been oxidized by the ozone is quickly dissolved into the moisture of the soil body 105 and chemically transformed thereby into nitrous acid or nitric acid, which is effectively absorbed by the soil body 105 and will finally be scattered as a $N_2$ gas serving as the substrate of denitrifying bacteria.

Therefore, the purified air from which contaminants have been removed flows from the surface of the soil layer 119 through the space 121 and the outlet port 115 into the atmosphere.

In the contaminated air purifying apparatus 100, as described above, the contaminated air is purified by the soil body 105. Since ozone is supplied to the contaminated air to transform nitrogen monoxide in the contaminated air into nitrogen dioxide before the contaminated air passes through the soil body 105, the nitrogen monoxide can more effectively be removed from the contaminated air than if no ozone were supplied and the contaminated air were processed by only the soil body 105.

If the surface of the soil body 105 is fully open to the atmosphere, then the contaminated air purifying apparatus 100 can be installed in a manner to match its surroundings without impairing the appearance thereof because the soil body 105 is exposed to view. The compatibility of the contaminated air purifying apparatus 100 with its surroundings is improved when trees and/or other plants are planted in the soil body 105.

[Experimental Example 3]

Figure 17:
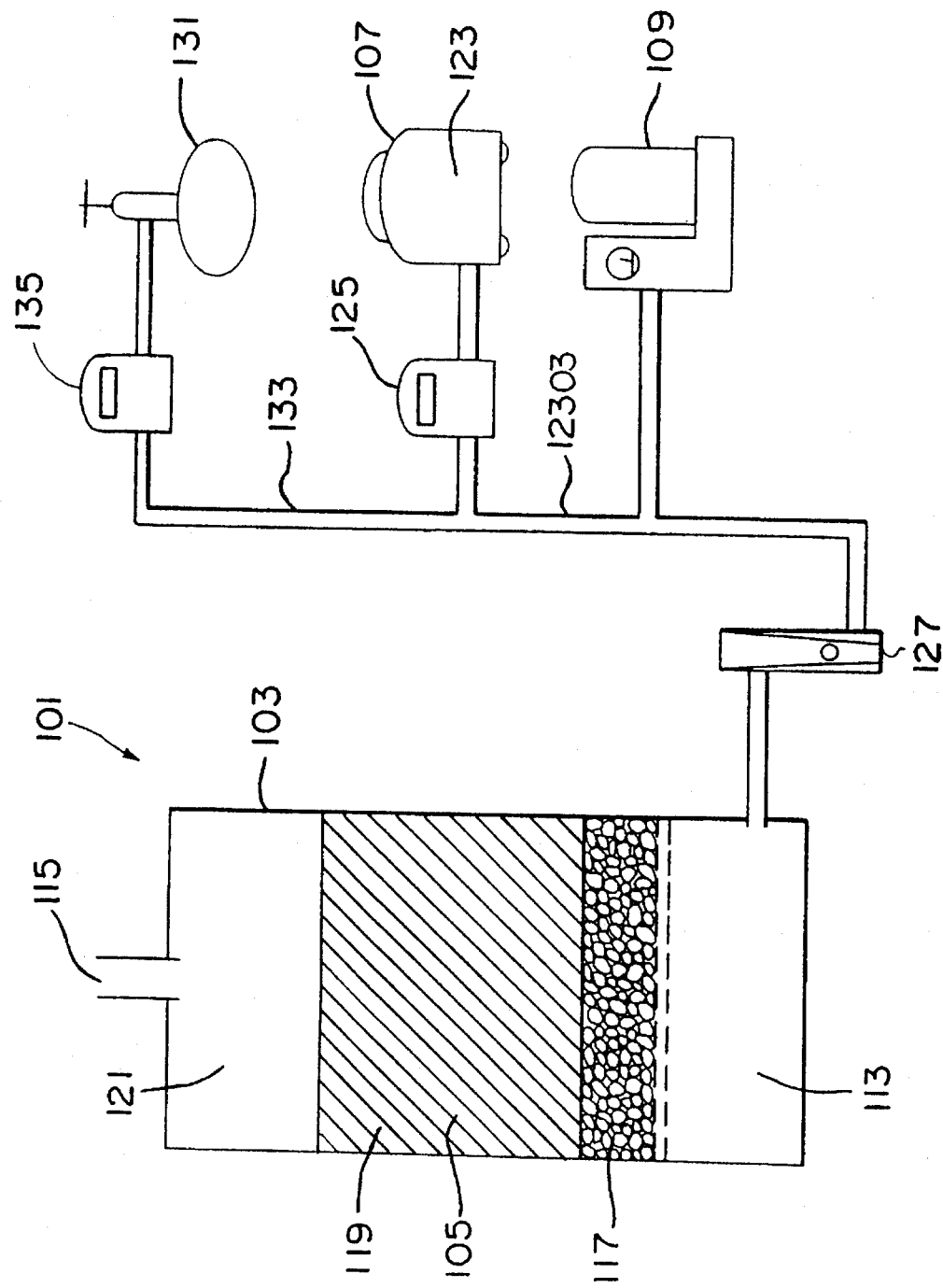
FIG. 17 is a schematic cross-sectional view of an experimentation system which includes the contaminated air purifying apparatus shown in FIG. 16.

An experimentation system which includes the contaminated air purifying apparatus shown in FIG. 16 will be described below with reference to FIG. 17.

A nitrogen monoxide container 131 was connected through a pipe 133 to the outlet pipe 12303 upstream of the mass flow controller 125, the pipe 133 having a mass flow controller 135.

The container 103 had an inside diameter of 36 cm and a height of 80 cm. The permeable layer 117 was composed of a layer of gravel having an average diameter of about 1 cm. The soil layer 119 was composed of a layer of andosols, peat moss, and perlite that are mixed at a volume ratio of 3:1:1 and had a vertical thickness of 40 cm.

Nitrogen monoxide was supplied from the nitrogen monoxide container 131 through the pipe 133 and the mass flow controller 135 to the outlet pipe 12303, and air was supplied from the air pump 123 through the mass flow controller 125 to the outlet pipe 12303, thus producing synthetic contaminated air having a nitrogen monoxide concentration of 1 ppm in the outlet pipe 12303.

Ozone was supplied from the ozonizer 109 at a rate of 10 mg/H to the outlet pipe 12303, and mixed with the synthetic contaminated air in the outlet pipe 12303. The synthetic contaminated air mixed with the ozone was delivered under a pressure of 0.1 $Kg/cm^2$ at a rate of 60 l/minute through the float-type flowmeter 127 to the space 113.

Nitrogen monoxide and nitrogen dioxide concentrations in the spaces 113, 121 were measured by high-sensitivity NOx meters. The measured concentrations are shown in FIG. 18.

In a comparative experiment, the ozonizer 109 was shut off, and only synthetic contaminated air was supplied under a pressure of 0.1 $Kg/cm^2$ at a rate of 60 l/minute to the space 113. Measured nitrogen monoxide and nitrogen dioxide concentrations in the spaces 113, 121 are shown in FIG. 19.

A study of FIGS. 18 and 19 shows that the nitrogen monoxide removal ratio was 90% at the time ozone was supplied, whereas the nitrogen monoxide removal ratio was 15% at the time ozone was not supplied. Consequently, it was found that the contaminated air purifying apparatus 100 was effective in removing nitrogen monoxide from contaminated air.

In the third embodiment, the contaminated air passes from the bottom to the top of the soil body 105, and the purified air is returned from the top of the soil body 105 to the atmosphere. However, the contaminated air may be supplied in the opposite direction, i.e., may be drawn from the top to the bottom of the soil body 105, and the purified air that has passed through the soil body 105 may be returned from the container 103 to the atmosphere.

The contaminated air purifying apparatus 100 according to the third embodiment is relatively inexpensive, can efficiently remove nitrogen monoxide and nitrogen dioxide from contaminated air, and can be installed at low cost with ease.

Unlike conventional physical and chemical denitrifying apparatus, the contaminated air purifying apparatus 100 employs a self-reproducible soil body, and hence requires no maintenance, can be operated continuously for a long period of time, and is highly cost-effective.

Although certain preferred embodiments of the present invention has been shown and described in detail, it should be understood that various changes and modifications may be made therein without departing from the scope of the appended claims.

What is claimed is:

1. The apparatus for purifying contaminated air, comprising:

a container;

a soil layer disposed in said container for being populated with microorganisms, said soil layer allowing contaminated air to pass therethrough;

means for defining a space in said container for introducing contaminated air therein;

air supply means for supplying contaminated air to said space and passing the contaminated air through said soil layer to purify the contaminated air;

an outlet port mounted on said container for discharging the purified air from said soil layer;

an ozonizer for generating ozone; and a communication passage interconnecting said ozonizer with said air supply means for supplying ozone to said air supply means to transform nitrogen monoxide contained in the contaminated air into nitrogen dioxide; and wherein the contaminated air and the produced nitrogen dioxide are supplied by said air supply means to said space.

2. The apparatus according to claim 1, wherein said air suppy means comprises a pipe connected to said space for introducing the contaminated air into said space, said pipe being connected to said communication passage.

3. The apparatus according to claim 2, wherein said means for defining a space comprises a mesh disposed in a lower portion of said container above a lower end panel of said container, said mesh supporting said soil layer and allowing contaminated air to pass therethrough, said space being defined in said container between said mesh and said lower end panel of said container, said outlet port being disposed on an upper end panel of said container, said air supply means comprising an air pump connected to said pipe for delivering the contaminated air through said pipe into said space.

* * * * *